United States Patent [19]

North

[11] 3,856,923

[45] Dec. 24, 1974

[54] PROCESS FOR PREPARING 1,1'-PEROXYDICYCLOHEXYLAMINE

[76] Inventor: Terance Washford North, Teran, Laddingford, Maidstone, England

[22] Filed: Oct. 15, 1970

[21] Appl. No.: 81,146

[30] Foreign Application Priority Data
Oct. 17, 1969 Great Britain.................... 51094/69

[52] U.S. Cl.............................................. 260/307 F
[51] Int. Cl............................................ C07d 85/26
[58] Field of Search................................ 260/307 F

[56] References Cited
UNITED STATES PATENTS
3,576,817  4/1971  Harris ................................. 260/307

*Primary Examiner*—Alex Mazel
*Assistant Examiner*—R. V. Rush
*Attorney, Agent, or Firm*—Brooks Haidt & Haffner

[57] ABSTRACT

A process for the production of 1,1'-peroxydicyclohexylamine by reacting cyclohexanone, hydrogen peroxide and ammonia in the presence of ammonium nitrate.

6 Claims, No Drawings

PROCESS FOR PREPARING 1,1'-PEROXYDICYCLOHEXYLAMINE

The present invention relates to a process for the production of 1,1'-peroxydicyclohexylamine.

1,1'-Peroxydicyclohexylamine, hereinafter referred to as peroxyamine (I) and the processes for its production are described in Belgian Pat. No. 701,327. This patent describes a process for making peroxyamine (I) by reaction of 1,1'-dihydroxydicyclohexyl peroxide, hereinafter referred to as peroxide (II), or substances giving peroxide (II) under the reaction conditions, with ammonia. Thus peroxyamine (I) may be prepared by reaction of hydrogen peroxide, cyclohexanone and ammonia.

1,1'-Peroxydicyclohexylamine may be converted into caprolactam, a starting material for the production of a polyamide (Nylon 6), by the process of Belgian Pat. No. 704,214 and to 11-cyanoundecanoic acid by the process of Belgian Pat. No. 702,603. The 11-cyanoundecanoic acid may be reacted further to give starting materials for the production of polyamides (e.g. Nylon 12). It is important that the monomers for the production of polyamides should be as pure as possible in order to obtain the optimum properties in the resulting polymer. It is therefore most important that the monomers and the materials from which the monomers are prepared should be as pure as possible. It is also important that the yield of peroxyamine (I) obtained should be as high as possible. When using expensive starting materials even an increase of a few percent in yield may be of considerable importance.

According to the present invention the process for the production of 1,1'-peroxydicyclohexylamine comprises reacting together cyclohexanone, hydrogen peroxide, and ammonia in the presence of ammonium nitrate.

The hydrogen peroxide may be in the form of an aqueous solution which may vary in strength over a wide range and examples of suitable concentrations are those in the range 10—60 percent by weight of hydrogen peroxide, for example solutions containing 20–40 percent by weight. However, hydrogen peroxide solutions containing as little as 2 percent by weight of hydrogen peroxide may be used. It may be desirable to add a stabilizer to the reaction mixture to obtain optimum yields. It is, however, preferable to add the stabilizer in the ammonia feeds. Examples of suitable stabilizers are the sodium salts of ethylenediaminetetraacetic acid (EDTA), e.g. disodium ethylenediaminetetra-acetate.

The ammonia may be fed to the reaction in the gaseous or in the liquid phase, e.g. in the form of an aqueous solution. When ammonia solutions are used, the concentration is not very critical and an example of a solution which may be used is the commercially available solution having a relative density of 0.880. It is preferable to use an excess which need only be a slight excess of ammonia, over the stoichiometric quantity. The stoichiometric quantity of ammonia is the number of moles of ammonia which equals the number of moles of 1,1'-dihydroxydicyclohexylperoxide, which could notionally be formed. Thus 2 moles of cyclohexanone and 1 mole of hydrogen peroxide can give 1 mole of 1,1'-dihydroxydicyclohexylperoxide and with these quantities of cyclohexanone and hydrogen peroxide the stoichiometric quantity of ammonia is 1 mole. It is desirable to use at least 0.5 moles of ammonia for each mole of cyclohexanone. The quantities of ammonia referred to above refer to free ammonia and not to bound ammonia as in ammonium nitrate.

The molar ratio of cyclohexanone to hydrogen peroxide may vary over a moderately wide range for example from 2.5:1 to 1.7:1, e.g. 2.1:1 to 1.9:1 but is preferably close to the stoichiometric ratio ie. 2:1. If a slight excess of cyclohexanone is used the utilisation of hydrogen peroxide is increased.

The concentration of the ammonium nitrate in the reaction mixture may vary over a moderately wide range for example from 2 to 12 percent by weight in particular 4 to 8 percent by weight of the total reaction mixture.

The reaction time may vary over a moderately wide range for example 1 to 20 hrs. In continuous reactions at temperatures of from 25° to 40°C residence time may vary from say 5 to 15 hours. Examples of convenient residence times are those in the range 7 to 11 hours.

The reaction may be carried out in any convenient manner batchwise or continuously. Efficient mixing of the reactants is dssirable. Thus the reaction may be carried out continuously in a stirred tank reactor and it is preferred to use two stirred tank reactors in series with the reaction product from the first reactor overflowing into the second reactor. With this arrangement using a reaction temperature for both reactors of about 30°C residence times of about 6 and 3 hours have been found convenient for the first and second tanks respectively.

The 1,1'-peroxydicyclohexylamine may be recovered in any convenient manner. the 1,1'-peroxydicyclohexylamine may be crystallized out from the reaction mixture, at a temperature below about 27°C. Alternatively at about 27°C and above, the 1,1'-peroxydicyclohexylamine separates as an oily layer which can be run out of the reactor. The 1,1'-peroxydicyclohexylamine may be purified further if desired, but will generally be of sufficient purity to enable it to be fed to further reaction without further treatment. It may be desirable to wash the oily layer containing 1,1'-peroxydicyclohexylamine with water to improve its stability as disclosed in our British Pat. No. 738,752.

The invention will now be illustrated by the following Examples. The apparatus used in these experiments consisted of two stirred tanks. An aqueous solution of hydrogen peroxide, an aqueous solution of ammonia, and cyclohexanone were fed continuously into the top of the first reactor. Reaction mixture was withdrawn continuously from the bottom of the first reactor and fed to the top of the second reactor. Reaction product was withdrawn from the bottom of the second reactor.

EXAMPLE 1

This example shows the use of 6 percent molar excess of hydrogen peroxide. Cyclohexanone (2.13 moles/hr.), ammonia solution having a relative density of 0.880 (2.8 moles free ammonia/hr.), and hydrogen peroxide solution having a concentration of 39 percent w/v (1.13 moles/hr.) were pumped continuously to the two stage continuous reaction system. The ammonia solution contained 16 percent ammonium nitrate as catalyst (equivalent to a concentration of 6.1 percent w/w in the total reaction mixture) and the hydrogen peroxide solution contained 7.2 percent disodium EDTA as stabiliser. Both reactors were maintained at 30°C and levels were adjusted to give a total residence time of nine hours. The yield of peroxyamine was 93 percent based on cyclohexanone.

EXAMPLE 2

Under the same conditions as Example 1, but reducing the ammonium nitrate concentration in the ammonia solution to 14 percent (equivalent to a concentration of 5.3 percent w/w in the total reaction mixture) a 90 percent yield of peroxyamine was obtained based on cyclohexanone.

EXAMPLE 3

Under the same conditions as Example 1, but reducing the hydrogen peroxide feed to 1.05 moles/hour, an 85 percent yield of peroxyamine was obtained.

EXAMPLE 4

Under the same conditions as in Example 1, but with a residence time of six hours and an ammonium nitrate catalyst concentration of 7.9 percent w/w in the reaction mixture an 88 percent yield was obtained.

EXAMPLE 5

Under the same conditions as Example 1, but where the ammonia solution contained 0.2 percent disodium EDTA as stabiliser the yield was 98 percent.

EXAMPLE 6

Under the same conditions as Example 5, but with a 10 percent excess of cyclohexanone in the feed (i.e. 2.49 mole per hour) the yield was 94 percent.

EXAMPLE 7

Under similar conditions as Example 1 but with a molar feed ratio of cyclohexanone to hydrogen peroxide to ammonia of 2:1:3, a 90 percent yield of the peroxyamine was obtained.

EXAMPLE 8

Under similar conditions as Example 1, but with a molar feed ratio of cyclohexanone to hydrogen peroxide to ammonia of 2.5:1:3, a 95 percent yield of the peroxyamine was obtained.

I claim:

1. A process for the production of 1,1'-peroxydicyclohexylamine comprising reacting together cyclohexanone, hydrogen peroxide and ammonia in the presence of ammonium at a temperature of from about 25° to 40°C nitrate.

2. A process according to claim 1 wherein the molar ratio of cyclohexanone to hydrogen peroxide is in the range 2.5:1 to 1.7:1

3. A process according to claim 1 wherein the molar ratio of cyclohexanone to hydrogen peroxide to ammonia is in the range 2:1:0.5 to 2:1:3.

4. A process according to claim 1 wherein the concentration of ammonium nitrate in the reaction mixture is in the range 2 to 12 percent by weight of the total reaction mixture.

5. A process according to claim 1 wherein the reaction is carried out in two reactors in series with the reaction product from the first reactor overflowing into the second reactor.

6. A process according to claim 1 wherein the total residence time of the reactants is in the range 1 –20 hours.

* * * * *

UNITED STATES PATENT OFFICE
CERTIFICATE OF CORRECTION

PATENT NO. : 3,856,923

DATED : December 24, 1974

INVENTOR(S) : TERANCE WASHFORD NORTH

It is certified that error appears in the above-identified patent and that said Letters Patent are hereby corrected as shown below:

Title page, insert the name of the Assignee, as follows:

--BP CHEMICALS LIMITED, London, England.--

Col. 2, line 24, correct the spelling of "desirable".

Col. 4, claim 1, cancel the term "in the presence of ammonium" on lines 3 and 4, and insert said phrase after "nitrate" on line 5 of said claim.

Signed and Sealed this twenty-fifth Day of November 1975

[SEAL]

Attest:

RUTH C. MASON
Attesting Officer

C. MARSHALL DANN
Commissioner of Patents and Trademarks